United States Patent
Yoshida et al.

(10) Patent No.: US 7,858,009 B2
(45) Date of Patent: Dec. 28, 2010

(54) SYNTHETIC LEATHER AND METHOD FOR PRODUCING THE SAME

(75) Inventors: Norihiko Yoshida, Fukui (JP); Yukari Suzuki, Fukui (JP)

(73) Assignee: Seiren Co., Ltd., Fukui (JP)

(*) Notice: Subject to any disclaimer, the term of this patent is extended or adjusted under 35 U.S.C. 154(b) by 1231 days.

(21) Appl. No.: 11/395,765

(22) Filed: Mar. 31, 2006

(65) Prior Publication Data

US 2006/0222816 A1 Oct. 5, 2006

(30) Foreign Application Priority Data

Mar. 31, 2005 (JP) ............................. 2005-104053

(51) Int. Cl.
- *B29D 7/00* (2006.01)
- *B32B 37/00* (2006.01)
- *B28B 1/14* (2006.01)
- *B28B 1/38* (2006.01)
- *B29C 41/18* (2006.01)
- *A61K 38/17* (2006.01)

(52) U.S. Cl. .................. 264/212; 264/172.19; 264/299; 264/301; 264/302; 530/353

(58) Field of Classification Search ............ 264/172.19, 264/173.1, 212, 213, 301, 302

See application file for complete search history.

(56) References Cited

U.S. PATENT DOCUMENTS 3,673,059 A * 6/1972 Brandt ........................ 442/71
5,718,954 A * 2/1998 Sano et al. ................. 428/35.6

OTHER PUBLICATIONS

English translation of abstract, JP 2000014592A, Masaaki Kabayama, Jan. 18, 2000.*
English translation of abstract, JP 04202857A, Shinya Ishimaru, Jul. 23, 1992.*
Translation of JP 2000014592 to Kabayama, published Jan. 18, 2000, 8 pages.*
Translation of JP 04202857 to Ishimaru, published Jul. 23, 1992, 4 pages.*

\* cited by examiner

*Primary Examiner*—Christina Johnson
*Assistant Examiner*—Benjamin Schiffman
(74) *Attorney, Agent, or Firm*—Dilworth & Barrese, LLP.

(57) ABSTRACT

An aqueous sericin solution and a polar organic solvent are mixed together to prepare a sericin-containing solution, then the sericin-containing solution is added into a synthetic resin solution, followed by drying, to produce an synthetic leather wherein sericin is present as discrete particles of not larger than 3 μm in diameter within the synthetic resin of a skin layer almost uniformly at least $1.0 \times 10^6$ particles per square centimeter. The skin layer of the synthetic leather has a soft and moist touch like that of the natural leather and is superior in moisture absorbing and releasing properties and further superior in processing stability.

7 Claims, 2 Drawing Sheets

SYNTHETIC LEATHER AND METHOD FOR PRODUCING THE SAME

FIELD OF THE INVENTION

The present invention relates to an synthetic leather and more particularly to an synthetic leather having a skin layer of a soft and moist touch like that of a natural leather and superior in moisture absorbing and releasing properties and further superior in processing stability, as well as a method for producing the synthetic leather.

PRIOR ART

The natural leather is one of materials which humans have utilized from old times and is at present utilized in the production of for example clothing, shoes, bags, furniture and vehicular interior trim materials. One of features of the natural leather is that it has such a soft and moist touch as does not give any unpleasant feeling to a man even if the leather contacts the man's skin and it has high moisture permeability and high moisture absorbing and releasing properties, without exhibiting any sticky feeling caused by sweat. Attempts have so far been made to imitate this feature in terms of an synthetic leather, but an synthetic leather which exhibits performance equal or superior to that of the natural leather has not been obtained yet.

For the purpose of creating a soft and moist touch and high moisture absorbing and releasing properties there has been proposed an synthetic leather which uses, for example, a hydrophilic group-introduced polyurethane, silicone-modified polyurethane or polyamino acid urethane in its skin layer.

However, such an synthetic leather does not possess such a soft and moist touch as is peculiar to the natural leather although it is possible to attain high moisture absorbing and releasing properties. In an effort to improve this point, in Japanese Patent Nos. 25260554 and 2812790 there is proposed an synthetic leather wherein a fine powder of a natural leather or a protein (natural collagen powder) is kneaded into a skin resin. But such natural materials as natural leather and protein are in many cases hydrophilic, poor in compatibility with solvent type resins and molten resin and are not uniformly dispersed in resin, thus resulting in appearing in a speckled state in the surface layer of the skin layer and the appearance thereof being impaired markedly.

As a method for improving the compatibility between a natural material and resin there is disclosed in Japanese Patent No. 2953532 a method which uses a polyamino acid urethane resin having a polypeptide linkage to create affinity for natural materials (fine powders of silk and wool fibers). However, the method using a polyamino acid urethane resin involves the problem that its application to a use for which a high strength is required is difficult, because the resin employable in the production of an synthetic leather is limited. Further, in Japanese Patent No. 3111290 is disclosed a method wherein the particle diameter of the natural sericin is made small or the shape thereof is made spherical to impart lubricity to the particles, thereby allowing the particles to be easily dispersed uniformly in resin. However, in case of reducing the particle diameter of sericin, the surface area of sericin increases, so that the cohesive force between particles becomes stronger, permitting easy occurrence of secondary and tertiary aggregations, and the particle diameter of an aggregate of sericin added to resin becomes larger than that of the fine powder of sericin before its addition. Therefore, in case of using sericin in the skin layer of an synthetic leather, aggregates of sericin are present partially in speckled states and thus there is a fear that the appearance of the synthetic leather may be impaired. Moreover, the sericin-added skin layer is deteriorated in its bonding strength because fine concaves and convexes are formed on the surface by the sericin particles, thus giving rise to the problem that the processing stability is poor at the time of forming the skin layer by film formation.

OBJECT OF THE INVENTION

It is an object of the present invention to solve the above-mentioned problems and particularly provide an synthetic leather having a soft and moist touch like that of the natural leather, having moisture absorbing and releasing properties, having a good appearance and being superior in processing stability.

SUMMARY OF THE INVENTION

Having made studies wholeheatedly, the present inventors solved the foregoing problems by adding sericin to a synthetic resin with use of a specific method.

More specifically, in a first aspect of the present invention there is provided an synthetic leather having as a skin layer a synthetic resin layer containing sericin, the sericin being present dispersedly in a state of discrete particles of not larger than 3 μm in diameter within the synthetic resin.

Preferably, in the synthetic leather according to the present invention, the sericin is present dispersedly as discrete particles of 0.5-3 μm in diameter at least $1.0 \times 10^6$ particles per square centimeter.

In a second aspect of the present invention there is provided a method for producing an synthetic leather, comprising mixing an aqueous solution of sericin with a polar organic solvent to prepare a sericin-containing solution, adding the sericin-containing solution into a synthetic resin solution to prepare a sericin-containing resin solution, and then preparing a skin layer of an synthetic leather with use of the sericin-containing resin solution.

In the synthetic leather producing method according to the present invention, in a preferred embodiment thereof, the sericin-containing resin solution is applied onto a release material such as release paper and dried to form a skin layer, then the skin layer is laminated onto a fibrous base through an adhesive.

In the synthetic leather producing method according to the present invention, in another preferred embodiment thereof, the sericin-containing resin solution is applied onto a fibrous base and dried to form a skin layer on the fibrous base.

In the synthetic leather producing method according to the present invention, in further preferred embodiment thereof, the sericin-containing resin solution is applied onto a skin layer of a synthetic leather comprising a synthetic resin layer as the skin layer on a fibrous base and dried to form a new skin layer.

EFFECT OF THE INVENTION

According to the present invention, since sericin is dispersed discretely and almost uniformly as fine particles within the synthetic resin which constitutes the skin layer, it is possible to provide an synthetic leather having a good appearance and a soft and moist touch like that of the natural leather and superior in processing stability and in moisture absorbing and releasing properties.

Figure 1:
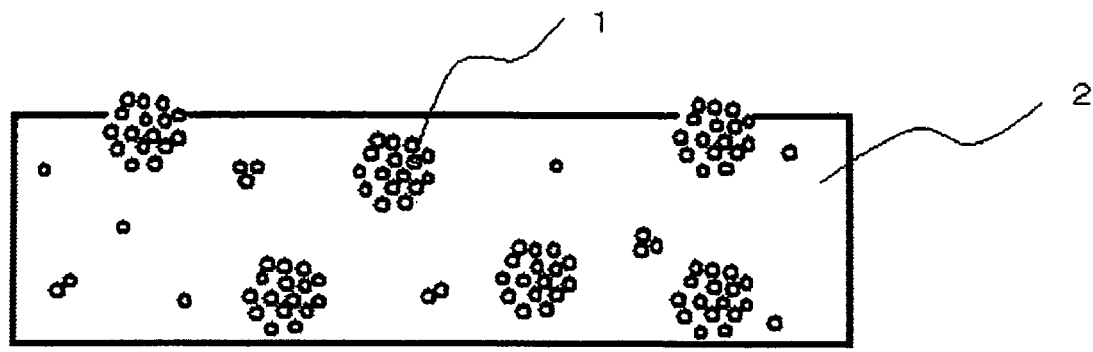
FIG. 1 is a conceptual diagram showing a state in which a sericin powder is dispersed in a state of aggregate within a synthetic resin.

In the drawings, the reference numeral 1 denotes sericin, numeral 2 denotes a synthetic resin, numeral 3 denotes a skin layer, numeral 4 denotes mold release paper, numeral 5 denotes cardboard, numeral 6 denotes a clip, and numeral 7 denotes a load.

DETAILED DESCRIPTION OF THE INVENTION

As the fibrous base used in the present invention there may be used any of, for example, woven, non-woven and knitted fabrics formed of synthetic, regenerated and/or natural fibers which fabrics have heretofore been known as fibrous bases for an synthetic leather. The construction and textile weave may be changed according to the purpose of use. From the standpoint of strength and processability, a knitted fabric formed of a synthetic fiber is preferred as the fibrous base, with a knitted fabric formed of a polyester fiber being particularly preferred.

As the synthetic resin as a constituent of the synthetic leather used in a laminated form to the fibrous base there may be used an organic polymer known heretofore as a synthetic resin for an synthetic leather. Examples include polyurethane resin, polyamino acid resin, vinyl chloride resin, SBR resin, NBR resin, acrylic resin, polyester resin, and copolymers and mixtures of these resins. Above all, from the standpoint of abrasion resistance and texture, polyurethane resins, copolymers thereof, and resinous mixtures containing a polyurethane resin as a main component, are preferred. Particularly, polycarbonate-based polyurethane resins are preferred.

Where required, known additives such as, for example, plasticizer, stabilizer, filler, lubricant, pigment, coating material, foaming agent and release agent may be incorporated in the synthetic resin. The synthetic resin is used as a solution in forming the synthetic leather. As the solvent which forms the solution there may be used a suitable known solvent according to the synthetic resin used. A typical example thereof is a polar organic solvent as will be described later, with dimethylformamide, dimethyl sulfoxide, N-methylpyrrolidone and sulfolane being particularly preferred.

In the present invention, the fibrous base which constitutes the synthetic leather, the synthetic resin solution for forming the skin layer of the synthetic leather, and conditions for forming the synthetic leather with use of those base and solution, can be selected in accordance with known techniques.

The sericin used in the present invention is derived from a natural protein sericin contained in cocoon or raw silk. Sericin (also referred to as "sericin hydrolyzate" extracted by hydrolysis from cocoon or silk is preferred. The amino acid composition of sericin is similar to that of a natural moisture retaining factor related to the adjustment of moisture of the skin corneous layer. The sericin in question contains much serine which is highly hydrophilic and is therefore highly hygroscopic. Besides, stickiness does not occur because the sericin in question is superior in moisture releasing property.

The sericin (hydrolyzate) can be obtained by extracting sericin contained in cocoon or silk by partial hydrolysis using an acid, alkali or enzyme and by subsequently adopting the following method (1), (2) or (3). Particularly preferred is one obtained as a high purity (preferably 90% or higher) powder having a molecular weight of 100,000 or less, more preferably 40,000 or less.

(1) The pH of an aqueous sericin solution is adjusted to 3 to 5 with use of an organic or inorganic acid, then an organic or inorganic flocculant is added, allowing sericin to precipitate, followed by filtration and drying to afford solid sericin.

(2) An aqueous sericin solution is mixed with a water-soluble solvent such as methanol, ethanol or dioxane to precipitate sericin, followed by filtration and drying to afford solid sericin.

(3) The material contained in an aqueous sericin solution and having permeated through a permeable membrane is removed and thereafter the material not having permeated through the permeable membrane is dried to afford solid sericin.

The present invention has paid attention to the moisture absorbing and releasing properties of sericin. In the present invention, sericin is added to the skin layer of an synthetic leather in a predetermined state and/or by a predetermined method, whereby it is intended to obtain an synthetic leather having a soft and moist touch like that of the natural leather and superior in moisture absorbing and releasing properties.

The synthetic leather according to the present invention is characteristic in that sericin is present dispersedly in a state of discrete particles of not larger than 3 μm in diameter within the synthetic resin of the skin layer which constitutes the synthetic leather.

By the phrase present dispersedly in a state of discrete particles is meant that sericin particles of not larger than 3 μm in diameter are present almost uniformly in a discrete state without aggregation. Preferably, when the surface of the skin layer in the synthetic leather is observed through an electron microscope (magnification: 1000×), the number of dispersed particles not smaller than 0.5 μm in diameter is $1.0 \times 10^6$ or more per square centimeter. The number of the above dispersed particles, which is particularly preferred, is $1.0 \times 10^6$ to $1.0 \times 10^7$ per square centimeter. Particles greater than 3 μm are preferably not substantially present.

Figure 2:
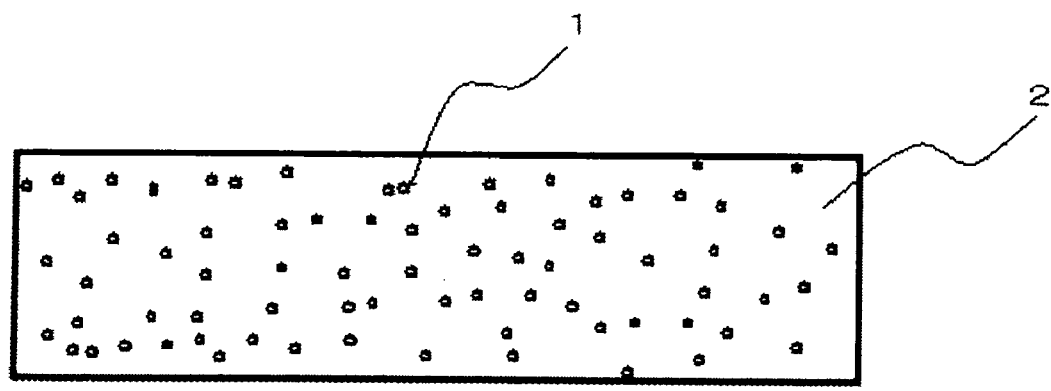
FIG. 2 is a conceptual diagram showing a state in which sericin is dispersed within a synthetic resin according to the present invention.

FIG. 1 is an image diagram showing a state in which sericin powder is dispersed in the form of aggregates and FIG. 2 is an image diagram showing a state showing a dispersed state of sericin powder in the skin layer of the synthetic leather according to the present invention.

The synthetic leather according to the present invention has a soft and moist touch like that of the natural leather, has moisture absorbing and releasing properties, has a good appearance and is superior in processing stability. If the diameter of sericin particles contained in the synthetic resin is larger than 3 μm, there is a fear that the appearance and elegance of the synthetic leather may be impaired. Moreover, in the case where the skin layer is formed using release paper, there is a fear of fine concaves and convexes being formed in the skin layer, with consequent peel-off of the release paper from the synthetic resin layer and deterioration of processing stability. Further, if the number of sericin particles having a diameter of 0.5 μm or less contained in the synthetic resin is smaller than $1.0 \times 10^6$ per square centimeter, there is a fear that the effect resulting from the addition of sericin, as well as the desired touch and moisture absorbing and releasing properties, may not be obtained. If the number of sericin particles contained in the synthetic resin is more than $1.0\times10^7$ per square centimeter, there is a fear that the abrasion resistance and outer appearance may be deteriorated.

As a method for adding sericin to the skin layer of the synthetic leather there may come to mind a method wherein sericin powder is kneaded and dispersed into the synthetic resin which forms the skin layer or a method wherein an aqueous sericin solution is mixed with a synthetic resin solution. However, the former method involves the problem that, since sericin is in the form of a powder, it is apt to aggregate, resulting in the appearance being impaired or the processing stability becoming unsatisfactory. The latter method involves the problem that, since the aqueous sericin solution and the synthetic resin solution are inferior in compatibility, it is difficult to make the two present uniformly.

The present invention is based on the finding that sericin is less aggregated and the compatibility with the synthetic resin solution is improved by adding a sericin-containing solution to the synthetic resin solution which is for forming the skin layer, the sericin-containing solution being obtained by mixing a polar organic solvent for dilution into an aqueous sericin solution containing sericin dissolved in water.

By mixing an aqueous sericin solution containing sericin dissolved in water in advance and a polar organic solvent for dilution with each other at a ratio to be described later, sericin becomes difficult to precipitate from the solution and is dispersed nearly uniformly in the synthetic resin solution with the sericin-containing solution added thereto.

In case of forming the skin layer by using the synthetic resin solution, the solvent volatilizes from the synthetic resin in a drying process for forming the skin layer and the resin viscosity becomes higher, so that the sericin contained in the synthetic resin becomes difficult to move and hence the skin layer can be formed while keeping sericin dispersed uniformly without aggregation.

As the solvent used in mixing with the aqueous sericin solution there is used a polar organic solvent compatible with both water and the synthetic resin solution in order to prevent water-synthetic resin separation. As examples there are mentioned alcohols such as methanol, ethanol, propanol, isopropanol and propylene glycol, ketones such as acetone, cyclohexanone and isophorone, polar organic solvents such as dimethylformamide, dimethyl sulfoxide, N-methylpyrrolidone and sulfolane, and these compounds in a mixed state with a small amount of a non-polar solvent. Above all, dimethylformamide is preferred from the standpoint of compatibility with water and the synthetic resin solution, cost and versatility.

Thus, the skin layer formed from a coating solution prepared by first mixing the aqueous sericin solution with the polar organic solvent and then adding the resulting sericin mixed solution into the synthetic resin solution is a skin layer wherein $1.0\times10^6$ per square centimeter or more of sericin particles not larger than 3 µm in diameter are dispersed nearly uniformly within the synthetic resin. Thus, sericin particles small in diameter are densely distributed in the skin layer and therefore it is possible to obtain an synthetic leather which is superior in moisture absorbing and releasing properties and which is difficult to be deteriorated in function even if the skin layer becomes worn. Besides, the synthetic leather obtained is superior in appearance and elegance because sericin does not aggregate in the skin layer.

Also by using the sericin-mixed synthetic resin not only in the skin layer but also in an intermediate layer between the perforated skin layer and fibers it is possible to impart moisture permeability and moisture absorbing and releasing properties to the synthetic leather.

Moreover, since sericin is used in a dissolved state in water, it is no longer required to specially restrict the particle diameter and shape of the added sericin.

The following description is now provided about a concrete method for adding sericin to the synthetic resin.

First, sericin is dissolved completely in water or warm water to prepare an aqueous sericin solution and a polar organic solvent is added to the aqueous sericin solution to prepare a sericin-containing solution. At this time it is preferable that the concentration of sericin in the aqueous sericin solution be 80 wt % or lower. If the sericin concentration is above 80 wt %, a sericin insoluble will precipitate in the state of an aqueous sericin solution, with a consequent likelihood of impairment in appearance of the resulting synthetic leather. Further, from the standpoint of stability of the aqueous sericin solution it is preferable that the sericin concentration be 40 wt % or lower.

It is particularly preferable that the molecular weight of sericin used be 40000 or less from the standpoint of solubility.

The proportion of water relative to the total amount of water contained in the sericin mixed solution plus the polar organic solvent is preferably 20 wt % or less. If the proportion of water is larger than 20 wt %, there is a fear of separation thereof from the resin solution because of poor compatibility with the resin solution.

By adding the sericin mixed solution thus prepared to the synthetic resin solution it is possible to obtain a sericin-containing resin solution. At this time, the amount of the sericin mixed solution to be added to the synthetic resin solution is arbitrary and can be adjusted according to purposes, but is preferably adjusted in such a manner that the amount of sericin contained in the sericin-containing resin solution becomes 20 wt % or less. If the amount of sericin contained in the sericin-containing resin solution is larger than 20 wt %, there is a fear that physical properties, e.g., abrasion resistance, of the synthetic leather may be deteriorated.

A crosslinking agent may be added for the purpose of improving the adhesion of sericin. In case of using a polyurethane resin, there may be used an isocyanate-based crosslinking agent such as, for example, hexamethylene diisocyanate (HDI) as an aliphatic compound, dichlorohexylmethane diisocyanate ($H_{12}$MDI) as an alicyclic compound, or tolylene diisocyanate (TDI), methylenediphenyl diisocyanate (MDI) or sylylene diisocyanate (XDI) as an aromatic compound.

Next, a description will be given below about manufacturing methods for the synthetic leather containing sericin in the skin layer.

According to a first method, a sericin-containing resin solution is applied onto a release material such as release paper and dried to form a skin layer, then the skin layer is laminated onto a fibrous base through an adhesive to afford an synthetic leather containing sericin in the skin layer. As the adhesive layer there is used a known adhesive organic polymer. Examples include polyurethane resin, polyamino acid resin, vinyl chloride resin, SBR resin, NBR resin, acrylic resin, polyester resin, and copolymers and mixtures of these resins. From the standpoint of adhesion to the skin layer and durability it is preferable to use a mixed resin containing a polyurethane resin or a copolymer thereof or a polyurethane resin as a main component. Above all, it is preferable to use a two-part moisture curing type hot melt resin which is a polycarbonate-based polyurethane resin and crosslinked by an isocyanate compound.

The adhesive layer can be formed applying the adhesive to a fibrous base or to a skin layer formed on release paper, using a known dry coating method such as, for example, spray coating, gravure coating, knife coating or roll coating, or a direct coating method using a thermoplastic resin.

The sericin-containing skin layer formed in this way is in a state in which $1.0 \times 10^6$ per square centimeter of sericin particles of not larger than 3 μm in diameter are dispersed almost uniformly within the synthetic resin. Thus, there is no fear of sericin aggregates or speckles being formed on the surface of the skin layer. Consequently, a lowering in the strength of bonding to release paper or the like is remedied and peeling caused by for example bending or shock, as well as such problems as pattern missing, luster defect and surface layer wrinkles, become difficult to occur in comparison with the sericin-containing skin layer formed by mixing sericin powder with the synthetic resin, resulting in improvement of processing stability.

According to a second method, a sericin-containing resin solution is applied onto a fibrous base and dried to form a skin layer on the fibrous base.

As a method for applying the sericin-containing resin solution there may be used a known dry or wet coating method such as, for example, spray coating, gravure coating, knife coating or roll coating. The same synthetic leather as above can be produced even by a method wherein a film of the sericin-containing resin is formed by a separator, followed by dry or wet lamination of the sericin-containing resin or synthetic resin to a fibrous base, or by thermal lamination of the film alone.

The same synthetic leather as above is further obtainable by applying the sericin-containing resin solution prepared by the method according to the present invention to the surface of a conventional synthetic leather in accordance with a dry or wet coating method such as spray coating, gravure coating, knife coating or roll coating.

EXAMPLES

The present invention will be described below by way of working examples thereof. Measurement and evaluation methods used in the working examples are as follows.

Number of Sericin Particles per Unit Area

The surface of a skin layer of an synthetic leather is photographed through an electron microscope (magnification: 1000×). The number of sericin particles of not smaller than 0.5 μm in aggregate diameter per 50 μm² in the photograph obtained is measured and is converted to the number per square centimeter. The same measurement is made at three arbitrary positions and a mean value is made the number of sericin particles per unit area.

Appearance

The skin layer of the synthetic leather is checked visually and evaluation is made on the basis of the following criterion:
○ Hue is uniform and there is no such defect as shading, luster defect or pattern missing.
x Hue is not uniform and there is such a defect as shading, luster defect or pattern missing.

Touch (Sensory Evaluation)

The following sensory evaluation method is performed:
○ Soft and moist touch, free of sticky feeling.
Δ Soft and moist touch, but there is sticky feeling.
x Soft and moist touch is not obtained.

Water Content

A test piece is dried at 105° C. for 2 hours, then is allowed to stand in an atmosphere of 20° C., 65% RH for 2 hours, thereafter the weight thereof is measured and a water content is calculated in accordance with the following equation:

Water content (%)=$(B-A)/A \times 100$

A: weight (g/m²) of the test piece dried at 105° C. for 2 hours
B: weight (g/m²) of the test piece after standing 2 hours in 20° C. 65% RH atmosphere Moisture Absorbing Property A test piece is dried at 105° C. for 2 hours, then is allowed to stand in an atmosphere of 20° C., 65% RH for 2 hours, thereafter the weight thereof is measured, then the test piece is allowed to stand in an atmosphere of 40° C., 90% RH for 2 hours, thereafter the weight thereof is again measured, and then a percent moisture absorption is measured in accordance with the following equation:

Percent moisture absorption (%)=$(B-C)/A \times 100$

A: weight (g/m²) of the test piece dried at 105° C. for 2 hours
B: weight (g/m²) of the test piece after standing 2 hours in 40° C. 90% RH atmosphere
C: weight (g/m²) of the test piece after standing 2 hours in 20° C. 65% RH atmosphere Moisture Releasing Property A test piece is dried at 105° C. for 2 hours, then is allowed to stand in an atmosphere of 40° C., 90% RH for 2 hours, thereafter the weight thereof is measured, then the test piece is allowed to stand in an atmosphere of 20° C., 65% RH for 2 hours, thereafter the weight thereof is again measured, and then a percent moisture release is calculated in accordance with the following equation:

Percent moisture release (%)=$(B-C)/A \times 100$

Figure 3:
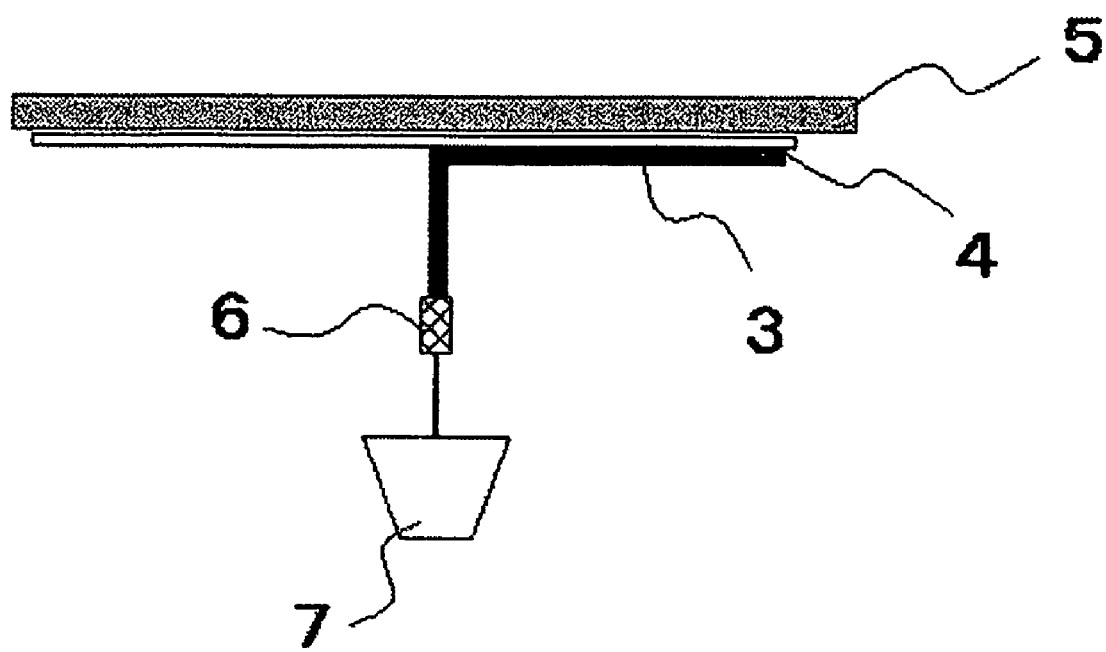
FIG. 3 is a conceptual diagram showing a bonding strength measuring method.
Figure 4:
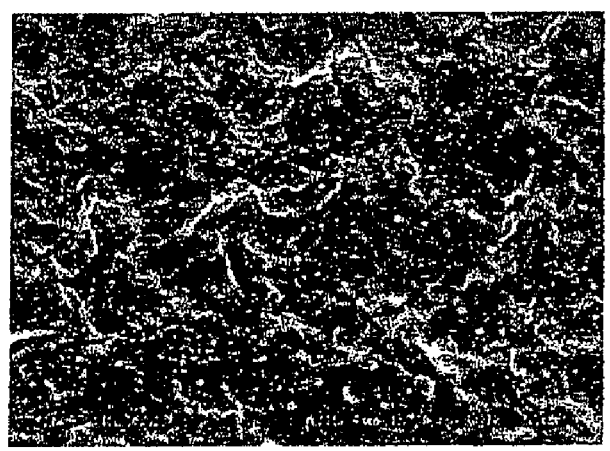
FIG. 4 is a photograph of a surface skin layer of an synthetic leather according to the present invention taken through an electron microscope.

A: weight (g/m²) of the test piece dried at 105° C. for 2 hours
B: weight (g/m²) of the test piece after standing 2 hours in 40° C. 90% RH atmosphere
C: weight (g/m²) of the test piece after standing 2 hours in 20° C. 65% RH atmosphere Bonding Strength A coating surface of polypropylene-based mold release paper (flat shape) is washed with methanol, then is coated with a skin layer resin to a thickness of 200 μm, followed drying at 100° C. for 2 minutes, to afford a skin layer. The skin layer thus formed is then cut to a size of 15 cm wide by 20 cm long to prepare a test piece. The test piece is then subjected to a load of 50 g in an atmosphere of 20° C., 65% RH as in FIG. 3 and the length of the skin layer peeled off from the mold release paper during the period of 5 minutes is measured.

Preparing Sericin-Containing Solutions

Sericin-Containing Solution A 5 g of SERICIN POWDER S (a product of Seiren Co., Ltd.) was dissolved in 5 g of distilled water and then 40 g of dimethylformamide was added to prepare a sericin-containing solution.

Sericin-Containing Solution B 18 g of SERICIN POWDER S (a product of Seiren Co., Ltd.) was dissolved in 12 g of distilled water and then 40 g of dimethylformamide was added to prepare a sericin-containing solution.

Sericin-Containing Solution C 5 g of SERICIN POWDER S (a product of Seiren Co., Ltd.) was added to 45 g of dimethylformamide to prepare a sericin solution.

Example 1

A sericin-containing resin solution was prepared in accordance with the following formulation 1 and dimethylformamide was added to a viscosity of 2000 cPs, then the resultant solution was applied onto mold release paper to a coating thickness of 200 μm, followed by drying at 100° C. for 2 minutes to form a sericin-containing skin layer.

An adhesive prepared by adding dimethylformamide to a polycarbonate-based polyurethane resin (CRISVON TA-205, a product of Dainippon Ink And Chemicals, Incorporated) to a viscosity of 5000 cPs was applied to the sericin-containing skin layer to a coating thickness of 200 μm, followed by drying at 100° C. for 1 minute, and the thus-dried coated skin layer pressed against polyester tricot fabric for 1 minute under the condition of 4 kgf/cm$^2$ to afford a sericin-containing synthetic leather. The results of measurement and evaluation are shown in Table 1.

Formulation 1

| | |
|---|---|
| Polycarbonate-based polyurethane resin (CRISVON NY-361, a product of Dainippon Ink And Chemicals, Incorporated) | 67 wt % |
| Sericin-containing solution A | 33 wt % |

Example 2

A sericin-containing synthetic leather was produced in the same way as in Example 1 except that there were used a sericin-containing skin layer prepared in accordance with the following formulation 2 and a polyether/polyester-based polyurethane resin (CRISVON TA-465, a product of Dainippon Ink And Chemicals, Incorporated) as an adhesive.

The results of measurement and evaluation are shown in Table 1.

Formulation 2

| | |
|---|---|
| Polycarbonate/polyester-based polyurethane resin (CRISVON NY-319, a product of Dainippon Ink And Chemicals, Incorporated) | 67 wt % |
| Sericin-containing solution B | 33 wt % |

Example 3

A sericin-containing synthetic leather was produced in the same way as in Example 1 except that there were used a sericin-containing skin layer prepared in accordance with the following formulation 3 and a polyether-based polyurethane resin (CRISVON TA-265, a product of Dainippon Ink And Chemicals, Incorporated) as an adhesive. The results of measurement and evaluation are shown in Table 1.

Formulation 3

| | |
|---|---|
| Polyether-based polyurethane resin (XOLTEX TX-309, a product of Dainippon Ink And Chemicals, Incorporated) | 66 wt % |
| Sericin-containing solution A | 33 wt % |
| Hexamethylene diisocyanate | 1 wt % |

Example 4

An synthetic leather was produced in accordance with the following formulation 4 and in the same way as in Example 1:

| | |
|---|---|
| Polycarbonate-based polyurethane resin (CRISVON NY-361, a product of Dainippon Ink And Chemicals, Incorporated) | 66 wt % |
| DMF (containing 15% of water) | 33 wt % |
| Hexamethylene diisocyanate | 1 wt % |

A sericin-containing resin solution prepared in accordance with the following formulation 5 was applied to the surface of the synthetic leather in an amount of 100 g/m$^2$ by means of a reverse coater, followed by drying at 100° C. for 2 minutes to afford a sericin-containing synthetic leather. The results of measurement and evaluation are shown in Table 1.

Formulation 5

| | |
|---|---|
| Polycarbonate-based polyurethane resin (LU4305 SP, a product of Dainichiseika Colour & Chemicals Mfg. Co., Ltd.) | 33 wt % |
| Polycarbonate-based polyurethane resin (LU4347 SP MAT, a product of Dainichiseika Colour & Chemicals Mfg. Co., Ltd.) | 33 wt % |
| Sericin-containing solution B | 33 wt % |
| Hexamethylene diisocyanate | 1 wt % |

Comparative Example 1

An synthetic leather was produced in the same way as in Example 4 except that the coating with use of the sericin-containing resin solution prepared in accordance with the formulation 5 was not performed. The results of measurement and evaluation are shown in Table 1.

Comparative Example 2

A sericin-containing synthetic leather was produced in accordance with the following formulation 6 and in the same way as in Example 1:

| | |
|---|---|
| Polycarbonate-based polyurethane resin (CRISVON NY-361, a product of Dainippon Ink And Chemicals, Incorporated) | 66 wt % |
| Sericin-containing solution C | 33 wt % |
| Hexamethylene diisocyanate | 1 wt % |

TABLE 1

|  | Ex. 1 | Ex. 2 | Ex. 3 | Ex. 4 | Com. Ex. 1 | Com. Ex. 2 |
| --- | --- | --- | --- | --- | --- | --- |
| Compatibility of sericin-containing solution | does not separate | does not separate | does not separate | does not separate | — | does not separate |
| Size of sericin (μm) | 2.2 | 2.8 | 2.3 | 2.5 | — | 27.8* |
| Amount of sericin (pc/cm$^2$) | $2.3 \times 10^6$ | $5.0 \times 10^6$ | $1.6 \times 10^6$ | $2.5 \times 10^6$ | — | $0.2 \times 10^6$ |
| Appearance | ○ | ○ | ○ | ○ | ○ | X |
| Touch | ○ | ○ | ○ | ○ | X | Δ |
| Water Content | 5.9 | 11.2 | 5.6 | 5.6 | <0.1 | 4.2 |
| Moisture Absorbing Property | 2.9 | 5.5 | 2.8 | 2.8 | <0.1 | 1.9 |
| Moisture Releasing Property | 2.1 | 4.1 | 2.0 | 2.1 | <0.1 | 1.5 |
| Bonding Strength (cm) | 6.0 | 5.2 | 6.0 | — | 10.0 | >20.0 |

*Size of aggregate

What is claimed is:

1. A method for producing an synthetic leather, comprising
   mixing an aqueous solution of sericin with a solvent consisting essentially of polar organic solvent to prepare a sericin-containing solution,
   then adding the sericin-containing solution into a synthetic resin solution to prepare a sericin-containing resin solution, and
   then forming a skin layer of an synthetic leather from the sericin-containing resin solution.

2. A method as set forth in claim 1, wherein the sericin-containing resin solution is applied onto a release material and dried to form a skin layer, then the skin layer is laminated onto a fibrous base through an adhesive.

3. A method as set forth in claim 1, wherein the sericin-containing resin solution is applied onto a fibrous base and dried to form a skin layer on the fibrous base.

4. A method as set forth in claim 1, wherein the polar organic solvent is dimethylformamide.

5. A method as set forth in claim 1, wherein the proportion of water relative to the total amount of water and the polar organic solvent in the sericin-containing solution is 20% by weight or less.

6. A method as set forth in claim 1, wherein the sericin-containing resin solution is applied onto a skin layer of a synthetic leather comprising a synthetic resin layer as the skin layer on a fibrous base and dried to form a new skin layer.

7. A method as set forth in claim 1, wherein the synthetic leather has a skin layer having discrete particles of sericin 0.5-3 μm in diameter without aggregation and with concentration at least $1.0 \times 10^6$ cm$^2$.

* * * * *